(12) United States Patent
O'Day et al.

(10) Patent No.: US 8,469,208 B2
(45) Date of Patent: Jun. 25, 2013

(54) DISPLAY UNIT

(75) Inventors: Stephen E. O'Day, Marlton, NJ (US); Joseph Roan, Media, PA (US); Ivan Letinic, Manalapan, NJ (US)

(73) Assignee: Art Guild, Inc., Thorofare, NJ (US)

( * ) Notice: Subject to any disclaimer, the term of this patent is extended or adjusted under 35 U.S.C. 154(b) by 403 days.

(21) Appl. No.: 12/792,887

(22) Filed: Jun. 3, 2010

(65) Prior Publication Data

US 2011/0297630 A1 Dec. 8, 2011

(51) Int. Cl.
*A47B 43/00* (2006.01)

(52) U.S. Cl.
USPC ........... 211/189; 211/169; 211/192; 403/167; 403/252

(58) Field of Classification Search
USPC .................. 211/189, 192, 45–48, 40, 41, 168, 211/169, 174; 248/220.22, 220.31, 220.41, 248/220.42, 220.43, 221.11, 222.11, 222.13, 248/243; 16/247; 403/109.3, 167, 168, 252
See application file for complete search history.

(56) References Cited

U.S. PATENT DOCUMENTS

| | | | | |
|---|---|---|---|---|
| 2,879,899 A * | 3/1959 | Shenkin | ................ | 211/55 |
| 3,330,418 A * | 7/1967 | Schneider | ................ | 211/47 |
| 3,730,108 A * | 5/1973 | Stroh | ................ | 108/108 |
| 4,133,433 A * | 1/1979 | Wolf | ................ | 211/192 |
| 4,256,043 A * | 3/1981 | Ovitz, III | ................ | 108/29 |
| 4,513,474 A * | 4/1985 | Watabe | ................ | 16/243 |
| 5,495,952 A * | 3/1996 | Kainz | ................ | 211/90.04 |
| 6,340,092 B1 * | 1/2002 | McGrath, Jr. | ................ | 211/169 |
| 6,547,087 B2 * | 4/2003 | Accatino | ................ | 211/169 |
| 7,908,711 B2 * | 3/2011 | Johnson | ................ | 16/366 |
| 2002/0023890 A1 * | 2/2002 | Jensen et al. | ................ | 211/168 |

* cited by examiner

*Primary Examiner* — Korie H Chan
(74) *Attorney, Agent, or Firm* — Volpe and Koenig, P.C.

(57) ABSTRACT

A display unit for displaying materials, such as flooring materials, is provided. The display unit includes a frame having a plurality of spaced apart legs arranged in a common vertical plane, each of the legs having a plurality of vertically spaced slots. The frame also includes a plurality of walls, each having two opposite end portions attached to two adjacent legs and arranged parallel to the common vertical plane. A plurality of horizontal rails having knife brackets affixed to opposite ends thereof is included. The knife brackets each include a plurality of engagement tabs that engage with the slots, and a movable locking device. A plurality of display pages are mounted for pivoting movement between an upper rail and a lower rail of the plurality of horizontal rails.

12 Claims, 18 Drawing Sheets

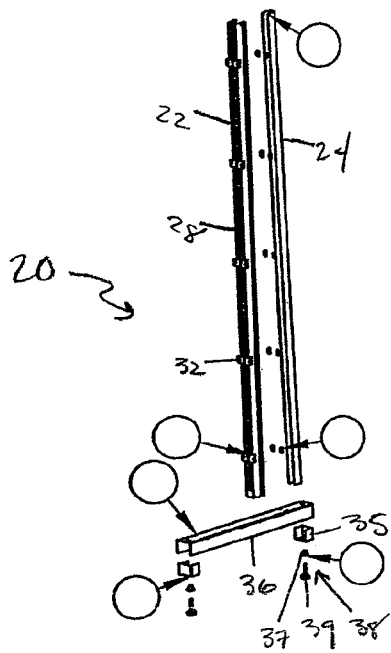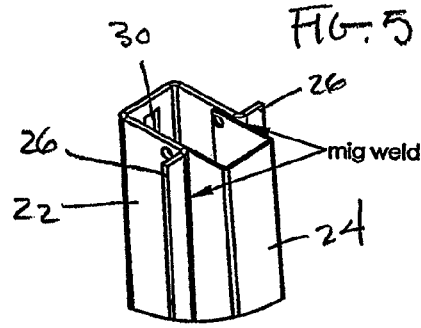

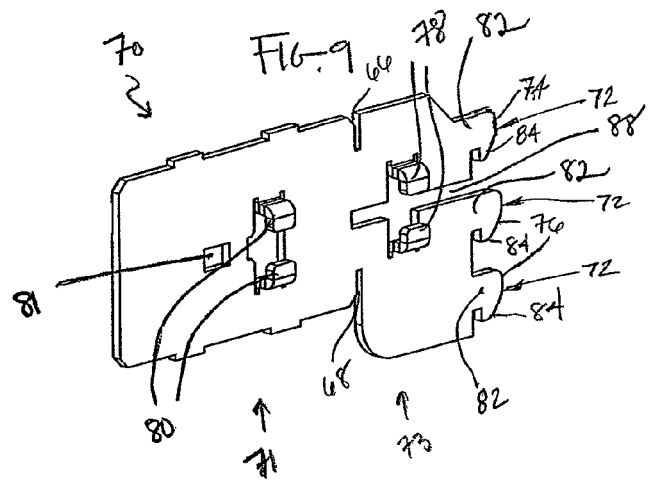
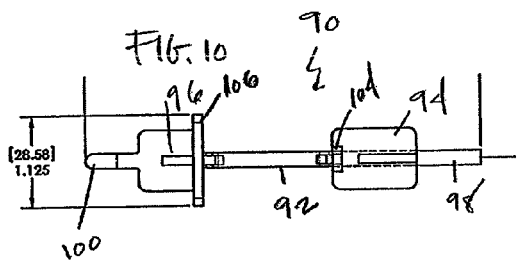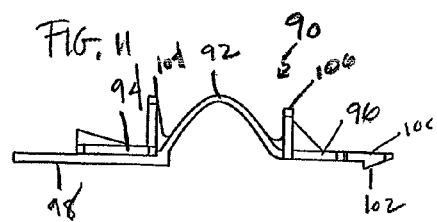
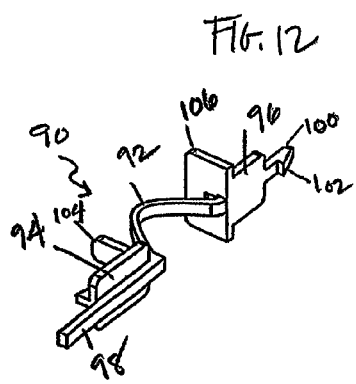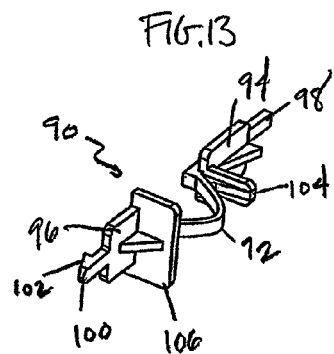

DISPLAY UNIT

FIELD OF INVENTION

The present invention relates to a display unit. More specifically, the present invention relates to a display unit for flooring materials.

BACKGROUND

In settings where flooring materials are sold, such as retail settings, samples of the flooring materials for sale are traditionally put on display for consumers to view. The samples are typically displayed on a display unit that may contain a particular type of flooring, or floorings produced by a particular manufacturer. Materials displayed may include wood flooring, laminates, tile, and carpets.

Display units come in various styles to meet different needs of a particular setting or to accommodate the different types of materials that are displayed. One common variety of display unit is the "winged" display unit, in which a plurality of pages or "wings" are pivotally affixed to a frame. The pages may be affixed to the display vertically or horizontally, and flooring samples are mounted to the pages. Typically, a single sample is mounted to each of the front and rear sides of each page. The flooring materials may be viewed by rotating the pages about their pivotal attachments to the frame. This style of display has the advantages of offering an aesthetically pleasing appearance and minimizing the space required to display a large amount of material.

One disadvantage of winged flooring displays is that they permit a limited range of sizes of flooring materials to be displayed. This is partly due to the fact that the pages are generally provided in a single size and will not accommodate samples outside of a very narrow size range. This is also a result of the fact that the pages only permit mounting of a single sample on each side of a page.

Another disadvantage is that the frames used in typical winged flooring displays further limit flexibility. Most frames will only accommodate a specific page size. Often this is because the pages are hinged between fixed upper and lower support rails.

It would be desirable to provide a flooring display unit having adjustable pages that permit the mounting of a variety of sizes of flooring samples, as well as the mounting of multiple samples on a single side of a page.

It would also be desirable to provide an adjustable frame that will accommodate various page sizes, or pages that are adjustable in size, as well as a frame that can be adjusted to accommodate varying numbers of pages. In providing such a frame, it would also be desirable to have components that are easily attachable and detachable to make the necessary adjustments, and which are securely connected and maintained in position when in the attached state.

SUMMARY

The present invention provides a display unit that can be adjusted to adapt to various environments and accommodate various sizes of display materials. The display unit is preferably used to display flooring materials, and can also be used to display other types of materials as well.

The display unit preferably includes a frame having a plurality of spaced apart legs arranged in a common vertical plane. Each of the legs has a top end and a bottom end. Each of the legs includes a plurality of vertically spaced slots. A plurality of walls are provided, with each of the walls having two opposite end portions attached to two adjacent legs and arranged parallel to the common vertical plane. The display unit is further provided with a plurality of horizontal rails having first and second ends, and first and second knife brackets are affixed to the first and second ends. Each knife bracket includes a plurality of engagement tabs that engage with the slots in the legs, and a movable locking device. A plurality of display pages are mounted for pivoting movement between an upper rail and a lower rail of the plurality of horizontal rails.

The present invention also provides a method for assembling a display unit. According to the method, a frame including a plurality of spaced apart legs arranged in a common vertical plane is provided. Each of the legs has a top end, a bottom end, and a plurality of vertically spaced slots. A plurality of walls are included as well, each of the walls having two opposite end portions connected to two adjacent legs and arranged parallel to the common vertical plane. The frame is further provided with a plurality of horizontal rails having first and second ends. Each of the ends includes an affixed knife bracket having a plurality of engagement tabs and a movable locking device. The display unit is assembled by opening the locking device and inserting each of the engagement tabs into a respective one of the slots of a respective leg, and then releasing the locking device so that it locks the engagement tabs into the respective slots.

The present invention provides a further method of assembling a display unit including a frame and a plurality of display pages pivotably connected to the frame. Each of the pages includes a first plurality of apertures, and a plurality of longitudinal dividers having projections are provided for connection to the pages. The projections on the dividers are dimensioned to be received by one or more complementary apertures in the page. According to the method, the longitudinal dividers are oriented horizontally and affixed to the pages at various vertical increments by inserting the projections into the apertures of the first plurality to create material receiving spaces therebetween.

BRIEF DESCRIPTION OF THE DRAWINGS

The foregoing Summary, as well as the following Detailed Description will be best understood when read in conjunction with the drawings which show a presently preferred embodiment. In the drawings:

FIG. 3 is an exploded front perspective view of a leg of the display unit of FIG. 1.

FIG. 4 is an front perspective view of a detail of the bottom portion of the leg of FIG. 3.

FIG. 5 is an rear perspective view of a detail of the top portion of the leg of FIG. 3.

FIG. 9 is a perspective view of a knife bracket of the horizontal rail of FIG. 7.

FIG. 10 is a side view of the locking device, as shown in FIG. 8.

FIG. 11 is a top view of the locking device of FIG. 10.

FIG. 12 is a rear perspective view of the locking device of FIG. 10.

FIG. 13 is a front perspective view of the locking device of FIG. 10.

FIG. 7B is an enlarged detail view of the page stop mounted on the left side taken at the indicated area of FIG. 17A.

DETAILED DESCRIPTION OF THE PREFERRED EMBODIMENT

Figure 1:
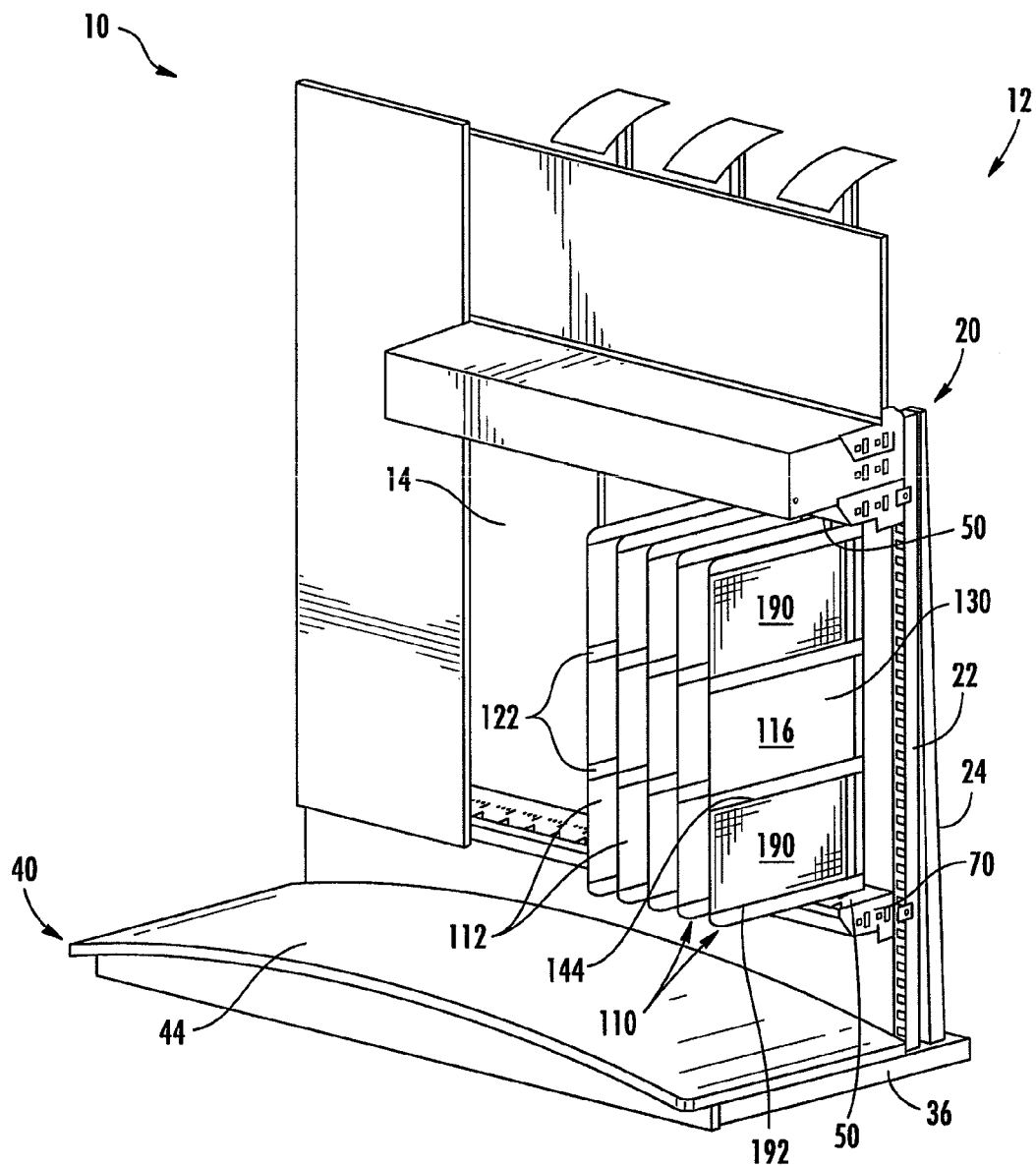
FIG. 1 is a perspective view of a preferred embodiment of the display unit.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. Additionally, the terms "a" and "one" are defined as including one or more of the referenced item unless specifically noted. The phrase "at least one of" followed by a list of two or more items, such as "A, B or C," means any individual one of A, B or C, as well as any combination thereof.

The preferred embodiments of the present invention are described below with reference to the drawing figures where like numerals represent like elements throughout.

Referring to FIG. 1, a preferred embodiment of the display unit 10 is shown. The display unit 10 comprises a frame 12, a plurality of horizontal rails 50 affixed to the frame 12, and a plurality of display pages 110 mounted for pivoting movement between upper and lower ones of the plurality of horizontal rails 50.

Figure 2:
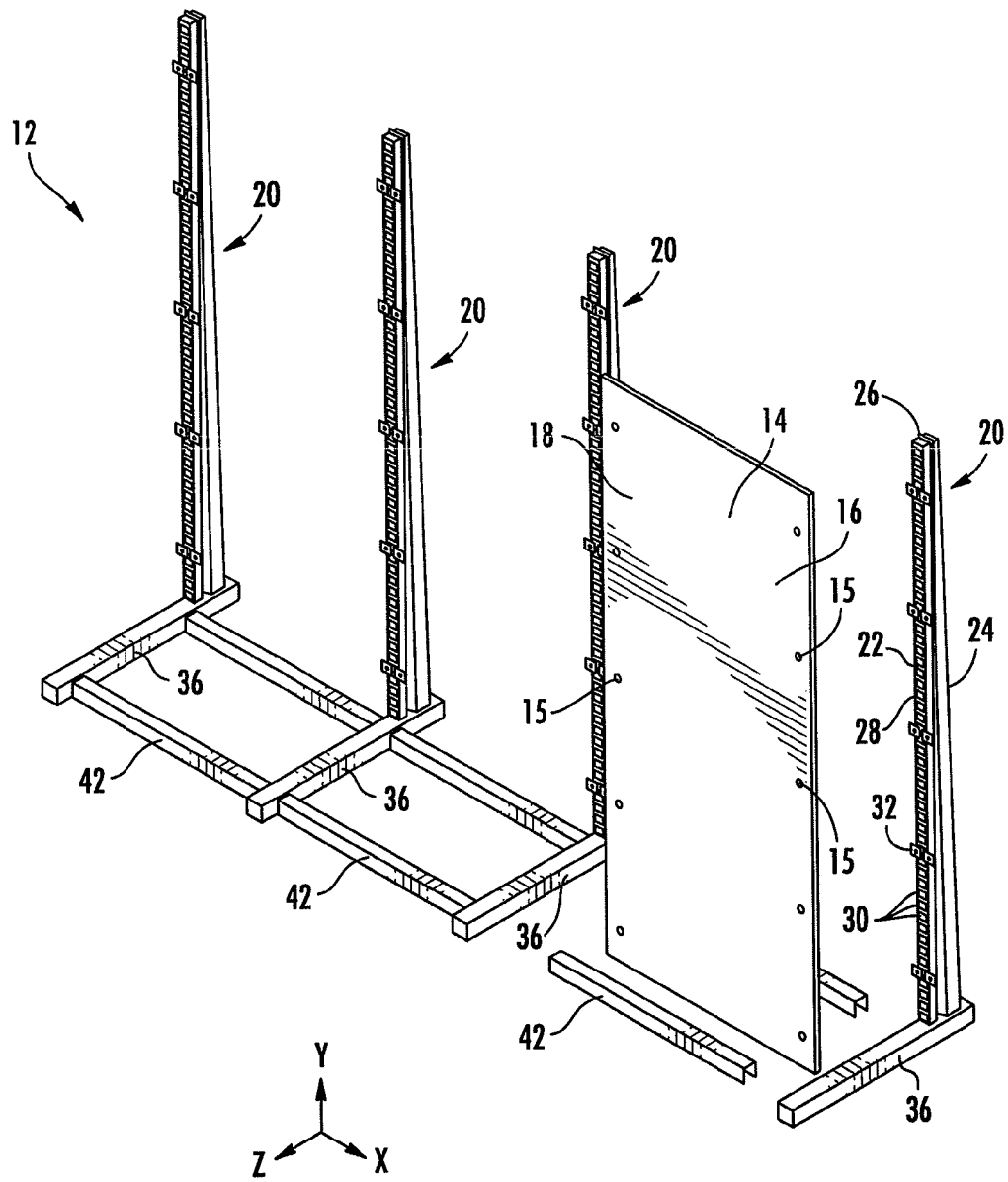
FIG. 2 is a partially exploded perspective view of the frame of the display unit of FIG. 1.

FIG. 2 illustrates a partially exploded view of the frame 12. As shown, the frame 12 includes a plurality of spaced apart legs 20 arranged in a common vertical plane, and a plurality of walls 14 (only one of which is shown), attached at opposite edge portions 16, 18 thereof to two adjacent ones of the legs 20. As shown in FIG. 1, the walls 14 are arranged in a vertical plane parallel to that of the legs 20. The number of legs 20 and walls 14 used to construct the frame 12 may be varied in order to adjust the size and therefore the number of display pages 110 the frame 12 will accommodate.

FIGS. 3-5 show the legs 20 of the preferred embodiment in greater detail. As shown, the legs 20 each comprise a U-shaped main channel 22 and a U-shaped closing channel 24 that provides support to the main channel 22. In the embodiment shown, the closing channel 24 is positioned directly behind the main channel 22. The closing channel 24 extends upward at an angle with respect to the main channel 22, and is attached to the main channel 22 starting at the top of the leg 20, as shown in FIG. 5, and preferably along the entire overlapping area of the main channel 22 and the closing channel 24. The closing channel 24 may be attached to the main channel 22 by any suitable fastening means known in the art, such as welding, adhesives, mechanical fasteners, or any combination thereof. In the preferred embodiment the closing channel 24 is attached to the main channel 22 by welding.

Still referring to FIG. 5, the main channel 22 and closing channel 24 both preferably have substantially U-shaped cross-sections, and are arranged with the open sides of the respective U-shapes facing each other, creating a substantially tubular structure at the upper portion of the leg 20 where they are joined. In the embodiment shown, the open side of the main channel 22 has a slightly greater width than the closing channel 24, such that a portion of the closing channel 24 fits within the open end of the main channel 22. Alternatively, the closing channel 24 could be of a greater width, and part of the main channel 22 could fit within the closing channel 24. The main channel 22 also preferably includes flanges 26 to provide additional support. The flanges 26 could also or alternatively be provided in the closing channel 24, or could be omitted.

Each of the legs 20 is preferably provided with a respective foot 36 for additional support. In the preferred embodiment shown, the feet 36 each extend generally perpendicular from a bottom end of a respective leg 20. The feet 36 may be attached to the legs 20 by similar attachment means to those mentioned above for joining the main channel 22 and the closing channel 24 of the leg 20, and are preferably welded thereto.

The feet 36 may be provided with leveling devices 38. The leveling devices 38 may be of any type known in the art. In the illustrated example of FIG. 3, each leveling device 38 comprises a support block 35 attached to the bottom of the foot 36, having either a threaded section or a nut 37 affixed thereto, and a threaded leveler 39 engageable with the nut 37. Adjusting the leveler 39 in the nut 37 alters the height of the leveler 39 from the bottom of the foot 36 to raise or lower the foot 36 with respect to a surface that it sits on in order to level the frame 12.

The main channel 22 of the leg 20 includes a face 28 having plurality of vertically spaced slots 30, as shown in detail in FIG. 4. The slots 30 allow the attachment of the horizontal rails 50, as described in greater detail below.

Ears 32 having holes 34 preferably extend from either side of the face 28 at spaced apart locations, as shown in FIG. 3. The inclusion of the ears 32 facilitates attachment of the walls 14 to the legs 20. Referring back to FIG. 2, the walls 14 include complimentary spaced holes 15, along opposite sides thereof. To assemble the frame 12, the legs 20 are arranged in a common vertical plane with their respective faces 28 aligned in parallel. The walls 14 are then arranged parallel to the common vertical plane and the holes 15 of the walls aligned with the holes 34 of the ears 32. Fasteners, such as screws, are inserted in the holes 15, and engage in the holes 34 of the ears 32, or in nuts 33 fastened to the ears 32 behind the holes 34.

The feet 36 may be connected by transverse members 42 to give the frame 12 additional stability and create a base 40. An outer covering 44 can also be provided to protect the base 40 and give it an aesthetically pleasing appearance.

Referring back to FIG. 1, the horizontal rails 50 are mounted to the frame 12 at varying heights. In the illustrated embodiment two rails 50 are provided for each wall, but more rails 50 may be provided as well in order to permit a greater number of pages 110 to be mounted to the frame 12.

Figure 6:
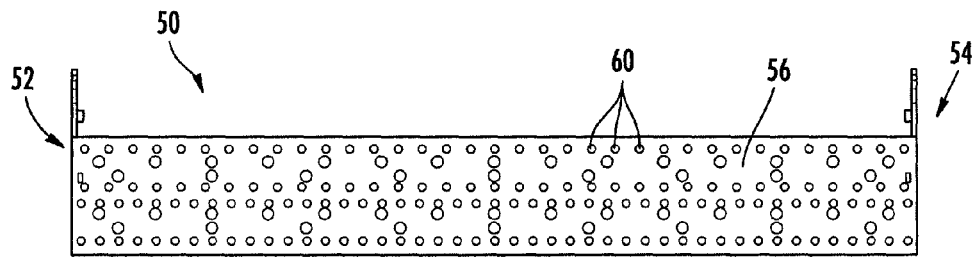
FIG. 6 is a top view of a horizontal rail of the display unit of FIG. 1.
Figure 7:
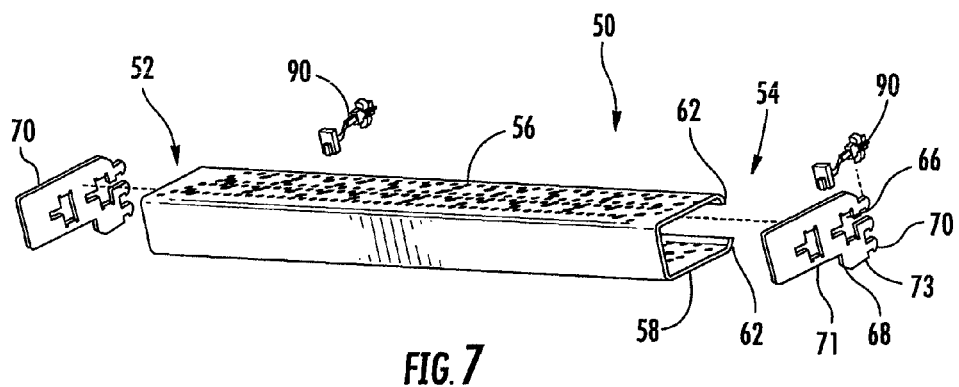
FIG. 7 is an exploded perspective view of the horizontal rail of FIG. 6, including removable locking devices.
Figure 8:
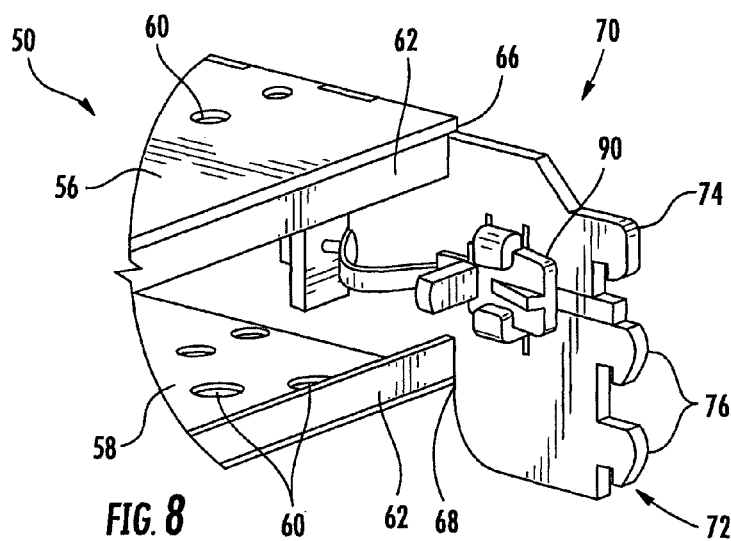
FIG. 8 is an enlarged detail of an end of the horizontal rail of FIG. 6, with a removable locking device affixed thereto.

FIGS. 6-8 show the assembly of one of the rails 50 in detail. The rails 50 each have first and second ends 52, 54, and top and bottom surfaces 56, 58. The top and bottom surfaces 56, 58 each include a plurality of holes 60. The holes 60 facilitate mounting of the display pages 110 to the frame 12, as described in greater detail below. In the embodiment shown, the rails 50 are formed from a three sided channel, with a substantially C-shaped cross-section, having inwardly directed flanges along the open side, and also having 62 and open ends 52, 54.

Knife brackets 70 are attached to the ends of the rails 50, as shown in FIGS. 7-9. The knife brackets 70 are preferably attached to the first and second ends 52, 54 of the rails 50 by welding, but may also be attached by other means, such as fasteners, bent tabs and/or adhesives. Upper and lower notches 66, 68, shown most clearly in FIG. 9, divide each knife bracket into a first section 71 attached to a respective end 52, 54 of the rail 50, and a second section 73 for attachment to a respective leg 20. In the illustrated preferred embodiment of the display unit 10, the knife bracket 70 is affixed to an end 52, 54 of the channel # such that each of the flanges 62 are aligned with a respective notch 66, 68.

FIG. 9 shows a knife bracket 70 of the preferred embodiment in detail. The knife bracket 70 further includes a plurality of engagement tabs 72 for engagement with the slots 30 of the legs 20. In the illustrated example, each of the knife brackets 70 includes three engagement tabs 72, but fewer or more engagement tabs 72 may be provided as well. Each knife bracket 70 further includes a channel 88 that extends to an outer edge of the knife bracket 70 between two adjacent engagement tabs 72. An upper engagement tab 74 is located above the channel 88, and at least one lower engagement tab 76 is located below the channel 88. Each of the engagement tabs 72 includes a neck 82 projecting from the outer edge of the knife bracket 70, and a first hook portion 84 extending downward from an end of the neck 82. The upper engagement tab 74 can optionally include a second hook portion (not shown) that extends upward from the end of the neck 82. The knife brackets 70 are fastened to the frame 12 by insertion of the engagement tabs 72 into the slots 30 of the legs 20.

As shown in FIGS. 7, 8, and 10-16 the knife brackets 70 are also provided with removable locking devices 90. Each locking device 90 includes a central spring element 92 disposed between first and second outer support plates 94, 96. In the preferred embodiment shown, the spring element 92 is an elastic member comprising an elongate curved strip of material. First and second pressure tabs 104, 106 are preferably disposed between the ends of the spring element and the outer support plates 94, 96. A locking strip 98 projects from a surface of the first support plate 94 and extends beyond an outer edge thereof. A retainer 100 extends from the second support plate 96 and includes a protuberance 102. Each knife bracket 70 preferably includes an opening 81 dimensioned to receive the protuberance 102 of the locking device 90. Preferably, the protuberance 102 is dimensioned to snappingly engage with the opening 81.

The knife brackets 70 are further provided with clasps 78, 80 that engage the support plates 94, 96. The front pair of clasps 78 is preferably provided to slidably engage the first support plate 94, while the rear pair of clasps 80 engage the second support plate 96. Each one of the clasps 78, 80 of the respective pairs is preferably located on an opposite side of the longitudinal extension of the locking strip 98, and engages an opposite edge of the respective support plate 94, 96.

The locking devices 90 are first engaged with the knife brackets 70, as shown in FIGS. 8 and 14-16. To engage the locking device 90 with the knife bracket 70, the first support plate 94 is placed flat against a side of the knife bracket 70 between the two sets of clasps 78, 80. The locking device 90 is oriented such that the first support plate 94 and locking strip 98 extend towards or past the edge of the knife bracket having the engagement tabs 72. The second support plate 96 is then aligned with and slid into the rear pair of clasps 80 until the protuberance 102 of the locking device 90 snappingly engages with the opening 81.

Figure 14:
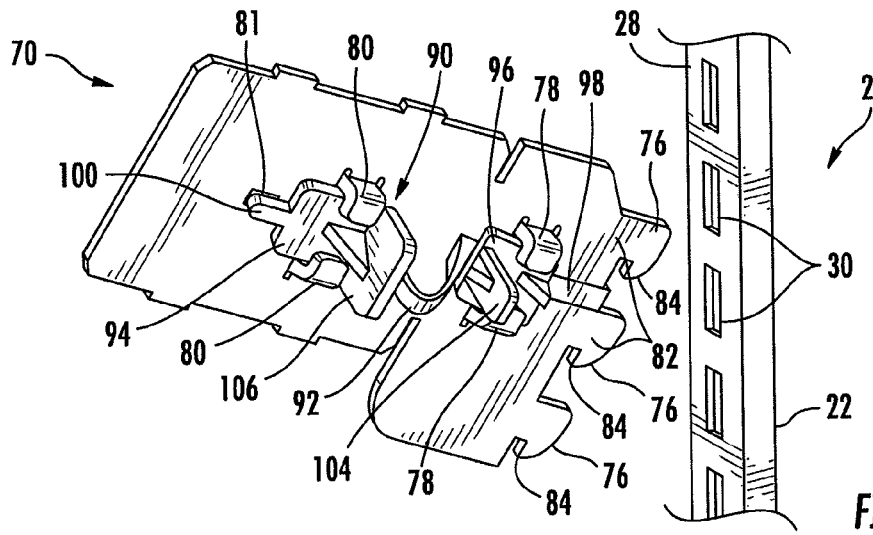
FIG. 14 is a perspective view of a knife bracket with a locking device engaged, just prior to insertion of the engagement tabs of the knife bracket into the slots of a leg.
Figure 15:
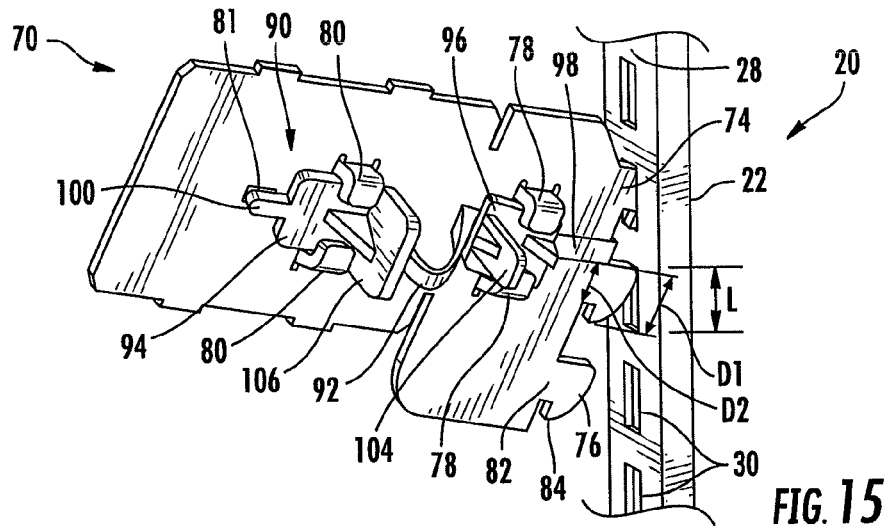
FIG. 15 is a perspective view the knife bracket and locking device of FIG. 14, with an upper engagement tab inserted into a slot of a leg.

The first support plate 94 is then moved along the same side of the knife bracket 70 to the opposite side of the front pair of clasps 78. The locking strip 98 is then inserted into the channel 88, and the first support plate 94 is slid in the same direction as the second support plate 96 until engaged by the front pair of clasps 78. The locking strip 98 should be almost entirely within the channel 88 at this point, with only the end portion extending past the end of the channel 88, as shown in FIGS. 8, 14, and 15. By pressing the first pressure tab 104 in a direction towards the second pressure tab 106, the locking strip can be withdrawn to an open position, fully in the channel.

To install the rails 50 on the frame 12, the engagement tabs 72 are preferably engaged with the slots 30 of the leg 20. The knife bracket 70 is oriented such that the upper and lower engagement tabs 74, 76 are aligned with corresponding slots 30 in the leg 20, as shown in FIG. 14. The hook portions 84 are then fed into the slots 30, as shown in FIG. 15, and the knife bracket 70 pushed in a downward direction such that the necks 82 of the engagement tabs 72 each abut a lower boundary of a respective slot 30. In the event that an upper hook portion is provided on the upper engagement tap 74 as an additional engagement surface to help retain the rails 50 in position, then the upper hook portions would need to be first inserted in a corresponding upper slot 30, and then the knife brackets 70 would be slid upwardly at the same time that the lower engagement taps 76 are rotated inwardly into corresponding slots 30, and the knife brackets 70 would then be slid downwardly so that the hook portions 84 all engage in the corresponding slots 30.

As shown in FIG. 15, the slots 30 each have a length L slightly greater than a first distance D1 separating upper and lower edges of the first hook portions 84 of the lower engagement tabs 76. A second distance D2, less than the first distance, separates upper and lower edges of the necks 82 of the lower engagement tabs 76. This configuration permits the engagement tabs 72 to fit within the slots 30 of the leg 20, and to be moved in a downward direction after insertion, as described above, such that the necks 82 each rest on a lower boundary of a respective slot 30.

Figure 16:
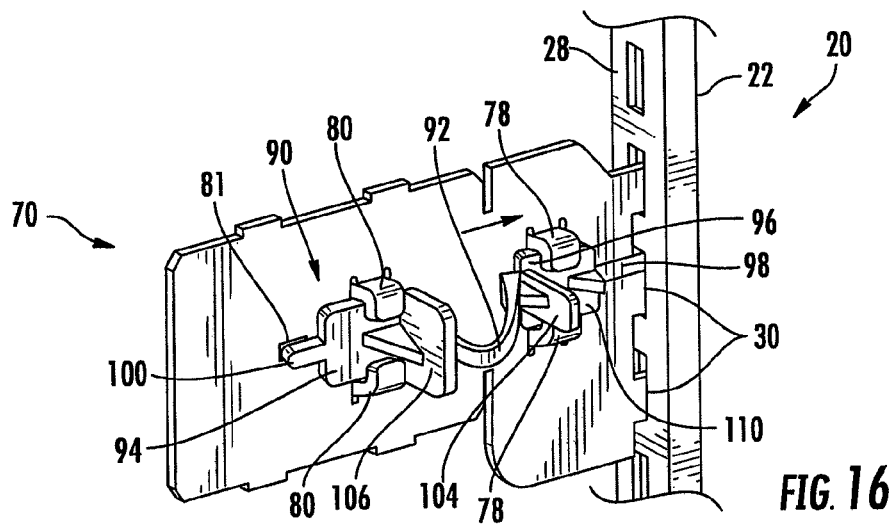
FIG. 16 is a perspective view of the knife bracket and locking device of FIG. 15, with each of the engagement tabs disposed within a respective slot of the leg and locked thereto with the locking device.

When the knife brackets 70 are affixed to the legs 20 in the manner described above, an upper portion of each slot 30 remains unoccupied by the engagement tabs 72. At this point, the knife bracket 70 could be moved in an upward direction such that the necks 82 each abut an upper boundary of a respective slot 30, and the engagement 72 tabs can be removed from the slots 30. Removal of the knife bracket 70 in this manner can be prevented by securing the knife bracket 70 to the respective legs with the locking device 70. After the engagement 72 tabs are inserted into the slots 30 and moved downward, as described above, the locking strip 98 is moved, preferably via the biasing force of the spring element 92, past the edge of the knife bracket 70 such that it extends along an upper edge of a lower engagement tab 76 located directly beneath the channel 88, and into an upper portion of the slot 30 unoccupied by the engagement tab 72, as shown in FIG. 16. With the entire slot 30 occupied by the neck 82 and the locking strip 98, the knife bracket 70 is blocked from moving in an upward direction with respect to the slot, as described above, and cannot be removed from the leg 20. As a result, unintentional disassembly of the display unit 10, which could be caused, for example, by bumping the knife bracket 70 in an upward direction, is prevented.

In order to disassemble the frame 12, the locking strip 98 is removed from the slot 30 by pressing the first pressure plate 104 in a direction towards the second pressure plate 106, to draw the locking strip 98 back so it is nearly entirely confined within the channel 88 and no longer extends into the slot 30. Once this has taken place, the knife bracket 70 can again be moved in an upward direction with respect to the leg 20, and removed therefrom in a conventional manner, as described above.

Figure 17:
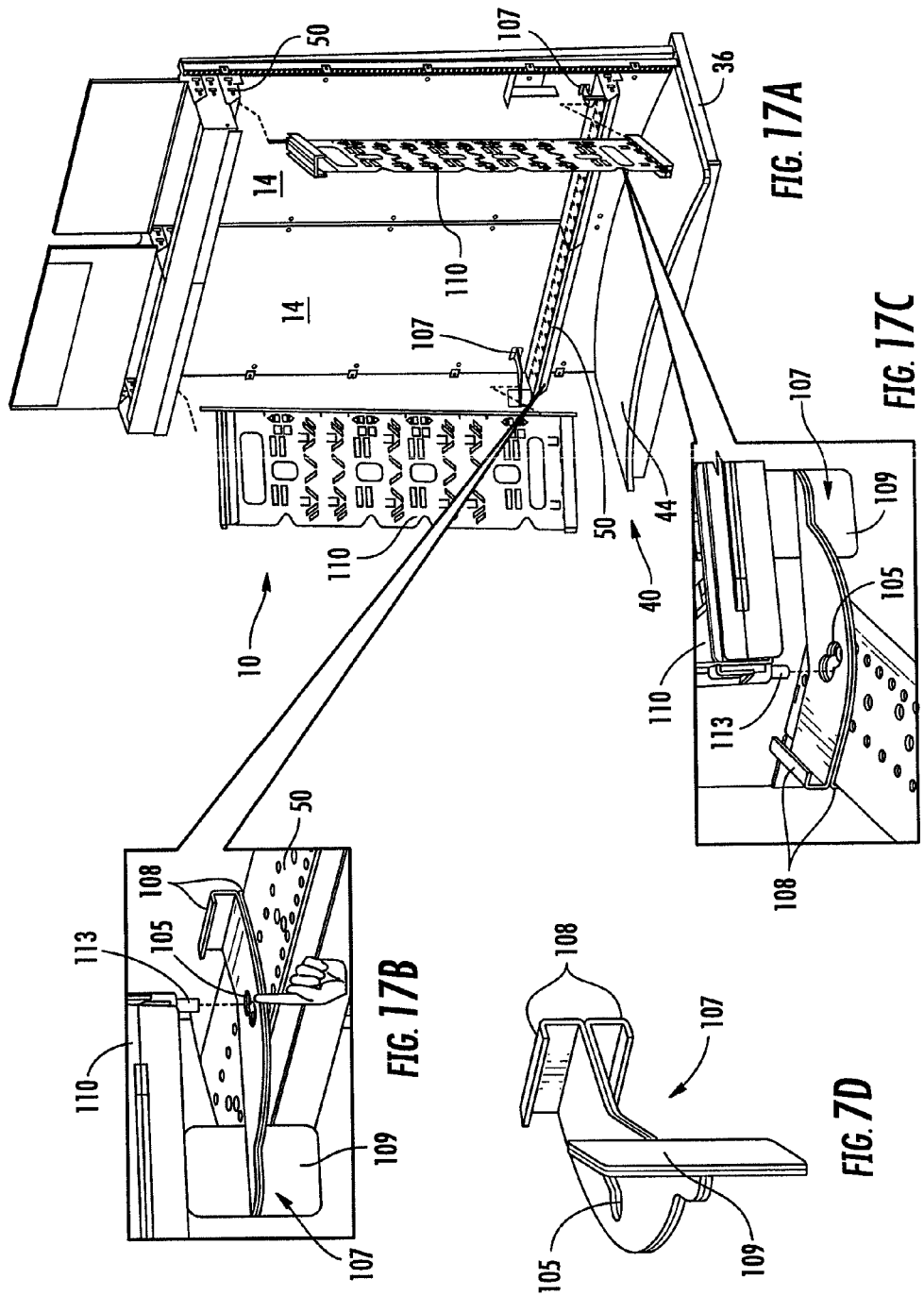
FIG. 17A is a perspective view of the partially assembled display unit showing a page stop being connected to the bottom horizontal rail.
FIG. 17C is an enlarged detail view of the page stop mounted on the right side of the display stand taken at the indicated area of FIG. 17A.
FIG. 17D is a perspective view of the page stop.
Figure 18:
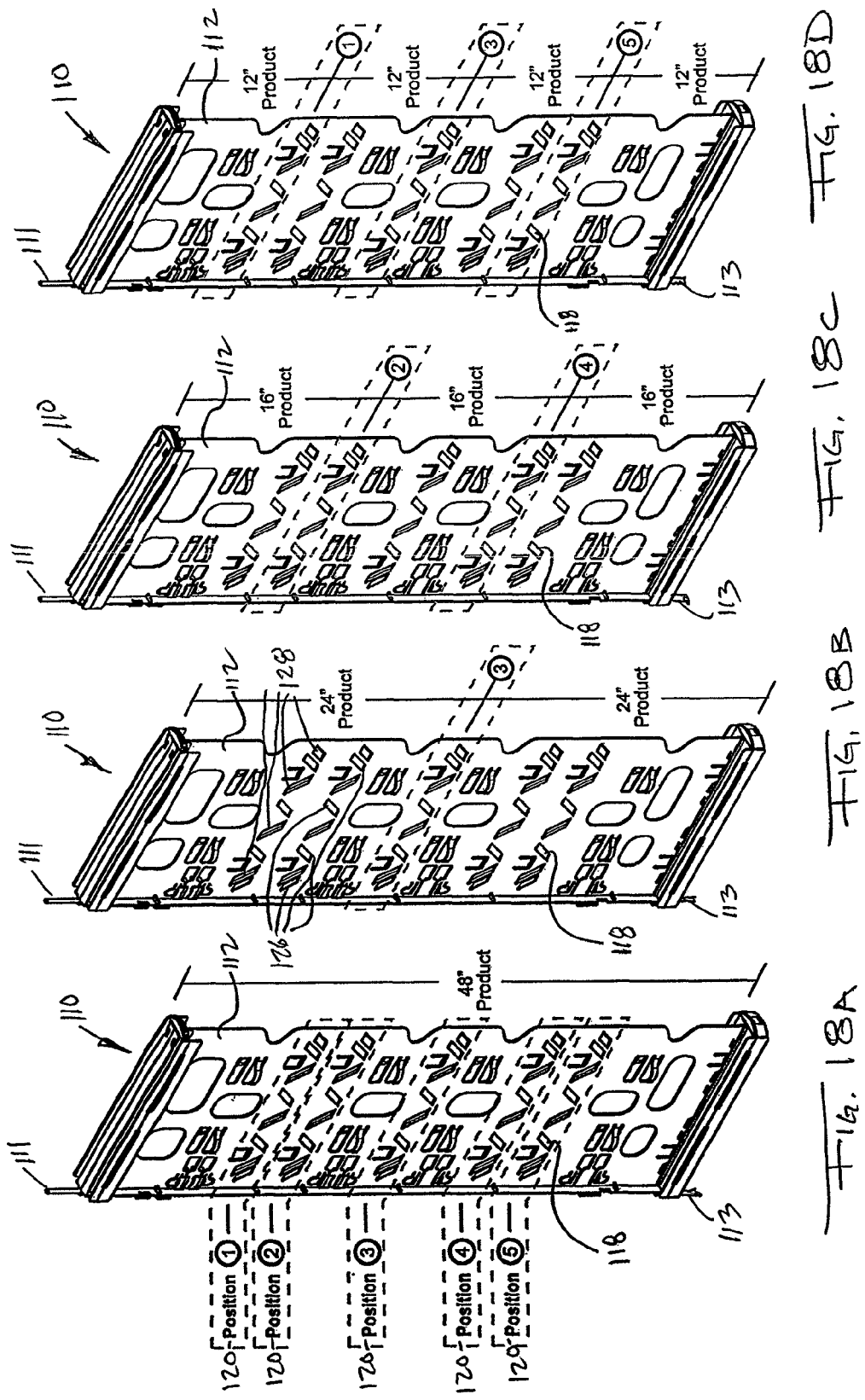
FIGS. 18A-18D are perspective views of a display page indicating positions where dividers can be installed to form different display page configurations.
Figure 19:
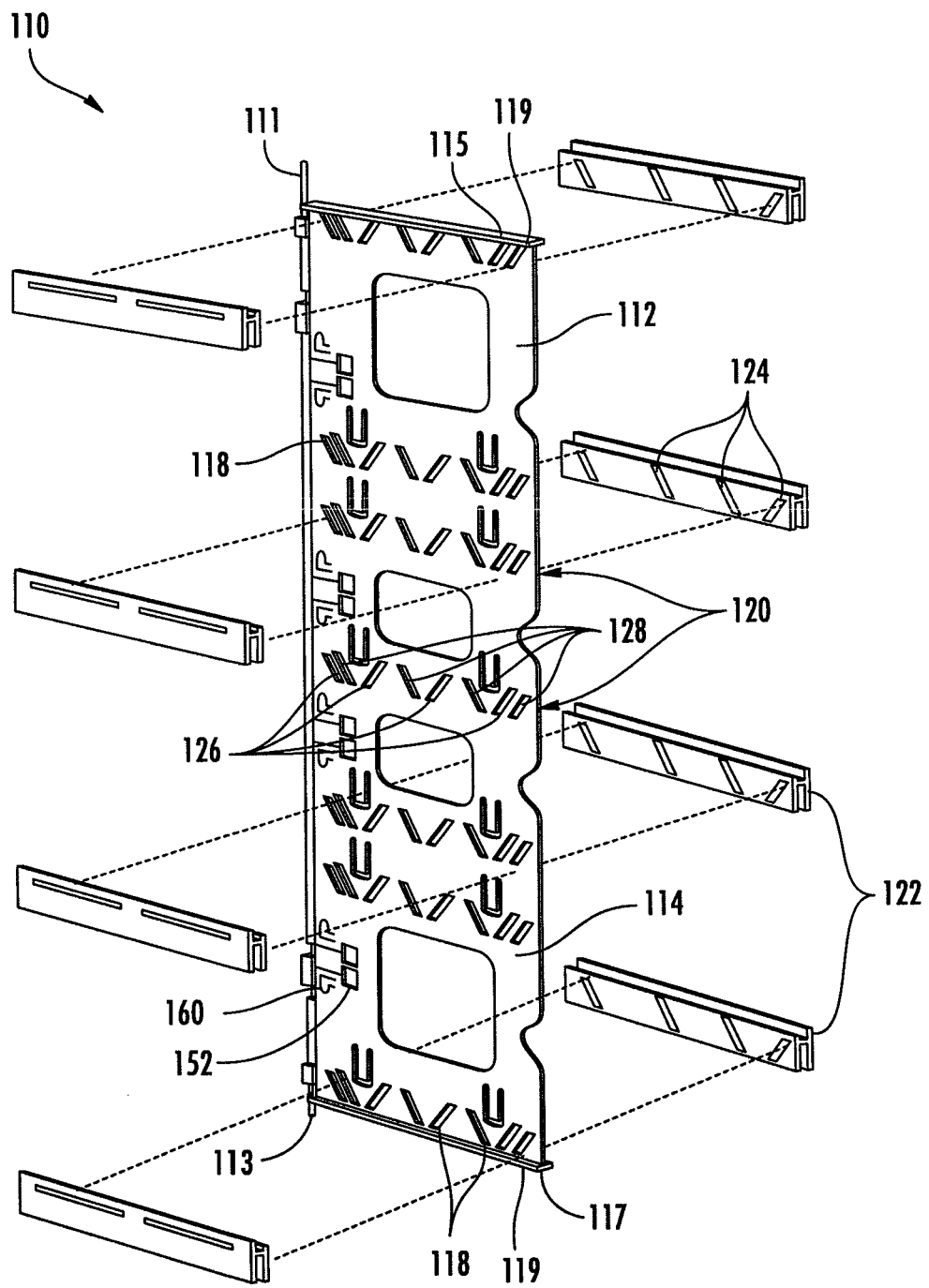
FIG. 19 is a partially exploded front perspective view of a display page of the display unit of FIG. 1, including dividers.

Referring to FIGS. 17A-17D, page stops 107 are engaged to the bottom rail 50 in order to limit the travel of a display page 110 on each end of the display 10. The page stops 107 include hooks 108 on one end that are sized to receive the bottom rail 50, and based on the positioning of two hooks 108, allow the page stop 107 to be installed on the left or right side by flipping over the page stop 107. A stop face 109 is positioned to contact a bottom area of a display page 110 when it is opened, as indicated in FIG. 17C. The page stop 107 is held in position via the hook 108 engaging the bottom rail 50 and the page stop 107 being moved so that the holes 105 defined in it are aligned with a corresponding hole in the bottom rail 50. The bottom pin 113 of the display page 110 is then inserted in order to lock the page stop 107 in the desired position. The page stop 107 is preferably made of bent-up sheet metal upper and lower halves, best shown in FIG. 17D, that are welded together. A separate stop plate 109 can be welded to the ends. However, any other suitable construction can be used, such as a molded plastic part or a machined part.

FIGS. 18A-D, 19, 20, 31, and 32 show the display pages 110 of the display unit in detail. Each page comprises a panel 112, having a front face 114 and a rear face 116 (FIG. 1), and bounded at the top and bottom by upper and lower strips 115, 117 extending along the upper and lower edges of the panels 112. The panels 112 are preferably formed by injection molding, and include a number of apertures, slots and resilient locking tabs that are integrally formed therein as described in detail below. Respective pins 111, 113 extend from the top and bottom near a side edge of the panel 112. The pins 111, 113 are preferably incorporated into the panel 112 structure during injection molding and are dimensioned to be received by the holes 60 of the horizontal rails 50. Each display page 110 is hinged between upper and lower ones of the plurality of horizontal rails 50 by insertion of the pins 111, 113 into respective holes 60 of the rails 50. Referring back to FIGS. 6 and 7, the holes 60 are positioned to extend at various distances from the walls 14 of the frame 12, permitting the extension of the pages 110 from the frame 12 to be varied.

Figure 20:
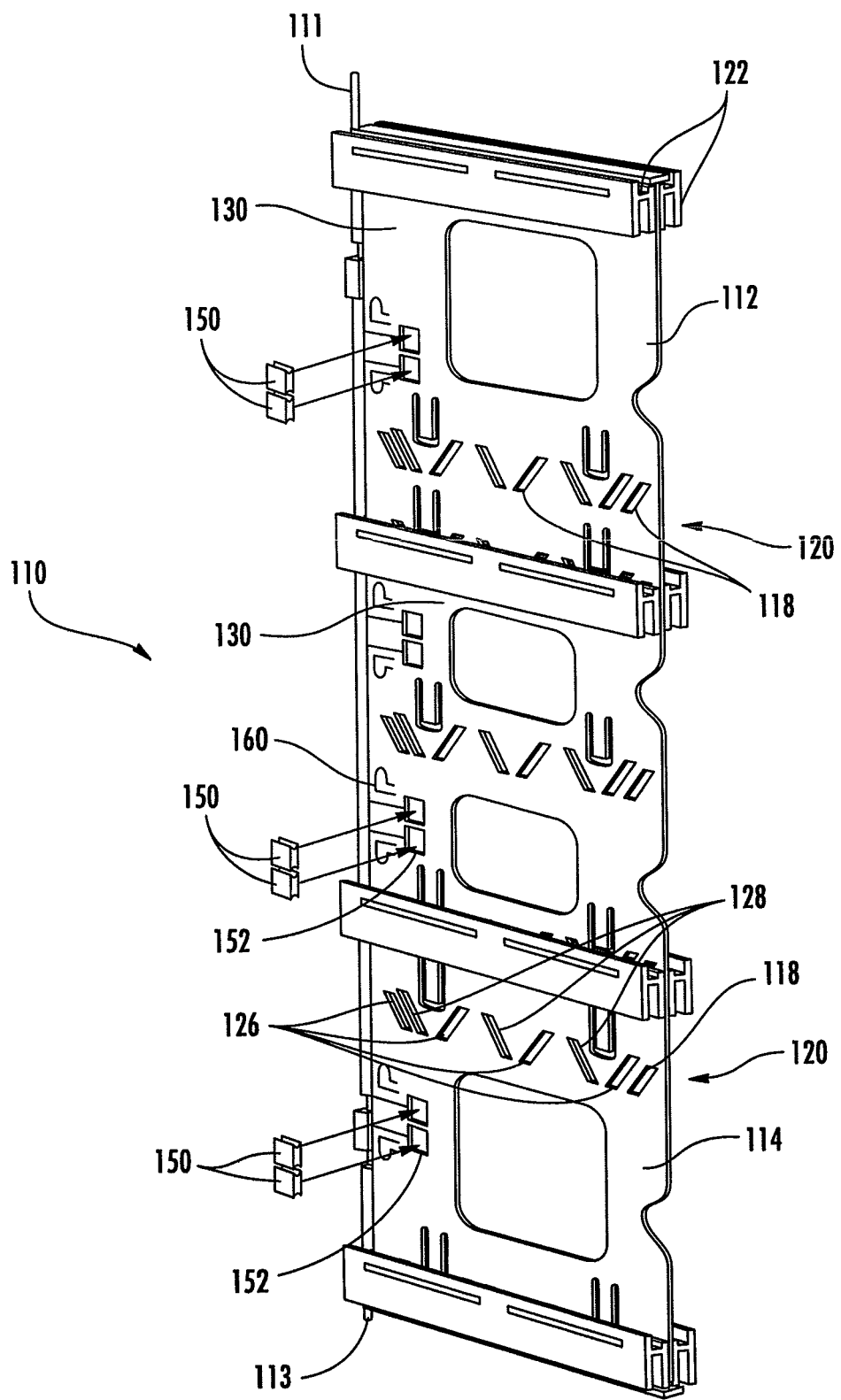
FIG. 20 is a partially exploded front perspective view of the display page of FIG. 19, including stops.

As shown in FIG. 18A-D and 19, each panel 112 includes a first plurality of apertures 118. The apertures 118 of the first plurality are preferably distributed across the width of the panel 112 in horizontal rows 120, five such rows being provided in one preferred embodiment shown in FIGS. 18A-D (indicated as 120 position 1-120 position 5). This arrangement allows the display pages 110 to be set up for varying size products, with exemplary dimensions being shown in FIGS. 18A-D for the product to be displayed, and the different divider positions to be used. FIG. 20 shows another divider arrangement for the display page 110 where products of two different sizes can be displayed on the same face of the page 110. Various other configurations could also be assembled. Dividers 122 having dovetail projections 124 dimensioned to be received by the apertures 118 are provided. The dividers 122 each preferably have a length equal to the width of a display page 110. The dovetail projections 124 of the dividers 122 are inserted into the apertures 118 of each display page 110 to divide it into multiple materials receiving spaces 130 (FIG. 20).

In the illustrated preferred embodiment, the apertures 118 of the first plurality are diagonally oriented slots. The projections 124 also have diagonal orientations matching those of the slots to permit the dividers 122 to be affixed horizontally to the panels 112. Preferably, the apertures 118 of the first plurality include a first group 126, oriented to receive the projections 124 from the side of the front face 114, and a second group 128, oriented to receive the same projections 124 from the side of the rear face 116. The apertures of the first 126 and second groups 128 preferably alternate within a common horizontal row 120. This configuration permits dividers to be placed directly across from each other on the front 114 and rear faces 116 of the panel 112.

Figure 21:
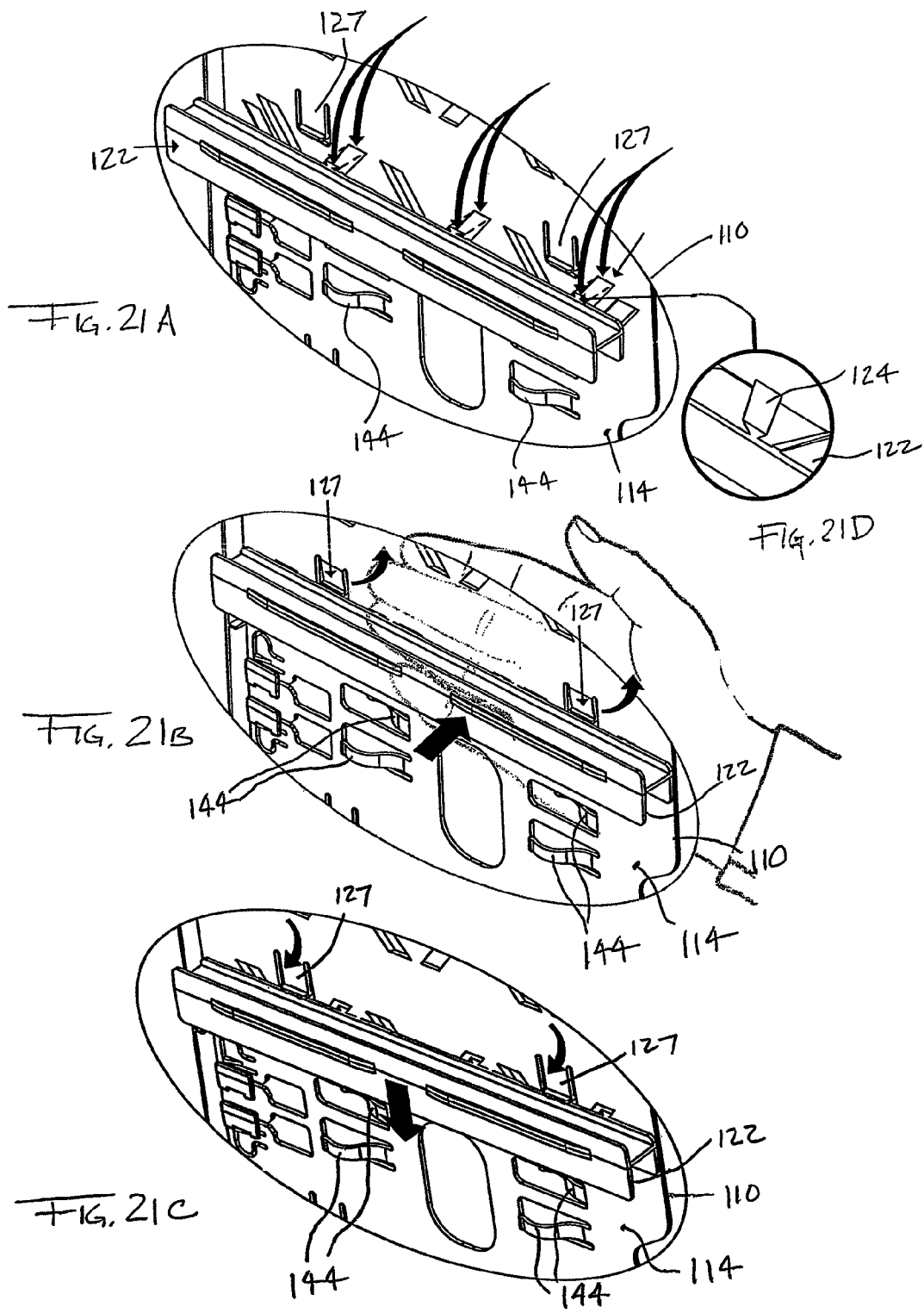
FIGS. 21A-21C are a series of perspective views showing the installation of a divider on the display page.
FIG. 21D is an enlarged detail of a dovetail protrusion on a divider taken in the indicated area from FIG. 21C.
Figure 22:
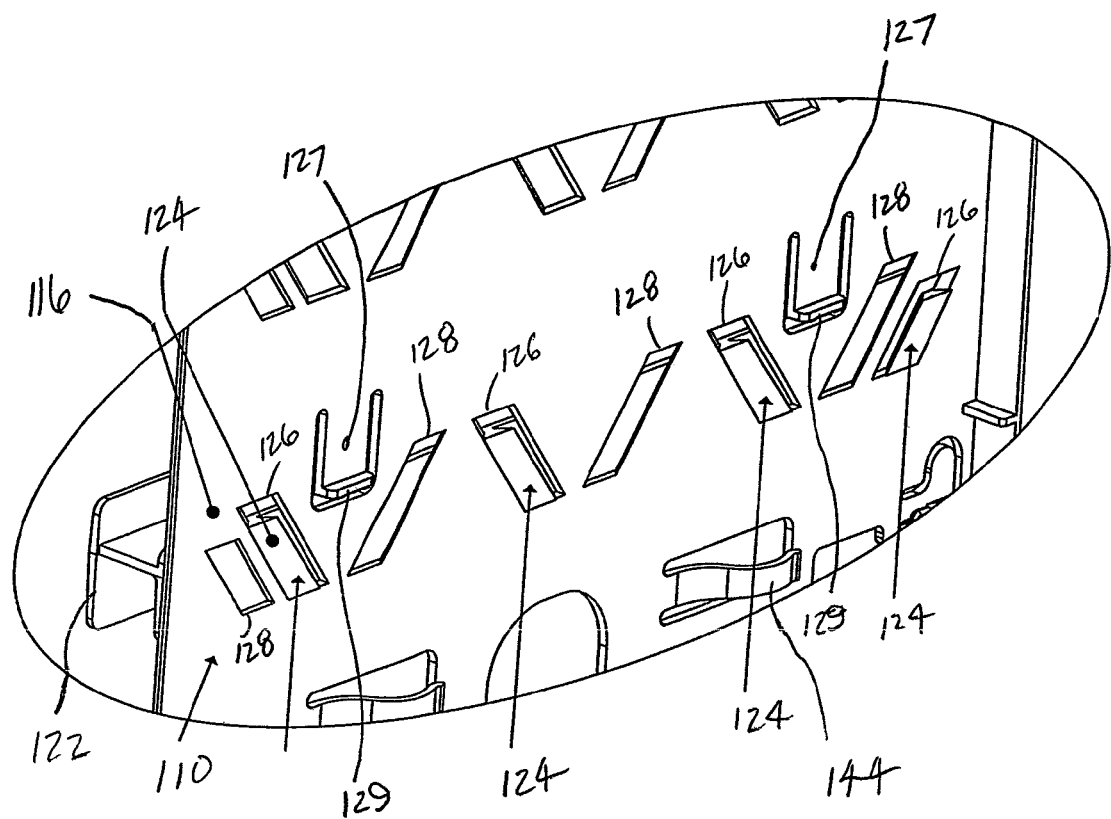
FIG. 22 is a partial perspective view of a back of the display page of FIG. 21C showing the connection of the divider to the display page.

Referring to FIGS. 21A-21C, the assembly of a divider 122 to a display page 110 is shown. The dovetail projections 124 are aligned with and inserted into the corresponding first group of apertures 126 in a desired row 120. The divider 122 is pressed toward the face 114 of the page 110 (preferably with one hand supporting the back of the display page as indicated), and flexes the associated locking tabs 127, which are formed in the display page 110, back into the page face 114. The divider 122 is then slid down so that the dovetail projections 124 engage with the correspondingly shaped dovetail apertures 126, and the locking tabs 127 then resiliently spring back to a position to hold the divider in position. As shown in FIG. 22, the dovetail projections 124 sit flush with the back face 116 of the display page 110. This allows another divider 122 to be aligned and installed at the same row 120 on the back face 116 of the display panel 110. Additionally, it can be seen from FIG. 22 that the locking tabs 127 have a projection 129 at the free end thereof that allows it to lock dividers 122 located on both faces 114, 116 of the display page 110 in position.

Referring to FIGS. 21A-21C and 22, expansion tabs 144 are preferably also formed on and protrude out from each face 114, 116 of the display page 110. Preferably, the expansion tabs 144 are integrally formed with the display page panel 112, and are resiliently deflectable in order to apply a pressure force against the back of a product being displayed. This eliminates any play in order to reduce rattles and bouncing of the products being displayed. In the preferred embodiment, the expansion tabs 144 are molded in the display page panel 112, and are arranged so that they are able to act against the backs of products being displayed, regardless of the specific configuration of dividers 122 being utilized. See FIGS. 18A-18D.

Figure 23:
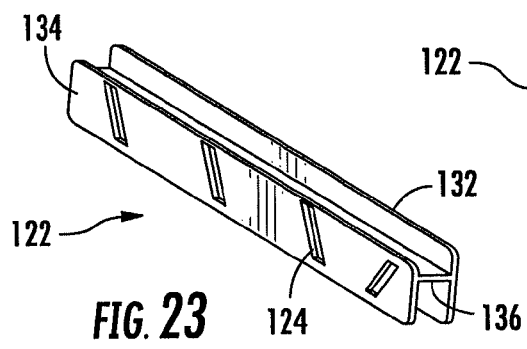
FIG. 23 is a rear perspective view of a divider, as shown in FIG. 19.
Figure 24:
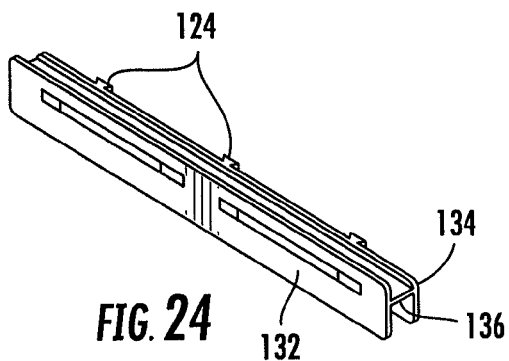
FIG. 24 is a front perspective view of the divider of FIG. 23.
Figure 25:
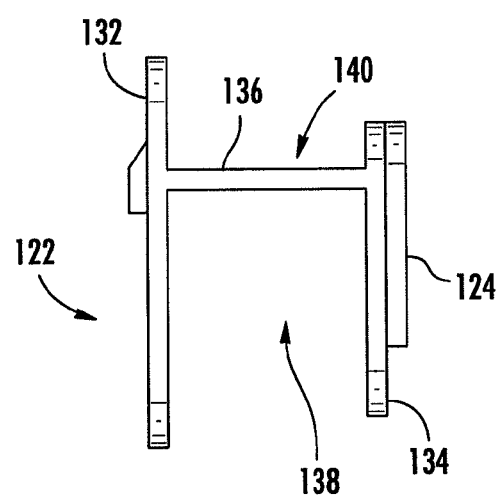
FIG. 25 is a side view of the divider of FIG. 23.

FIGS. 23-25 show a divider 122 in detail. As shown, the dividers 122 preferably each have a body including an outer wall 132, inner wall 134, and center wall 136, perpendicularly connecting outer 132 and inner wall 134, to form a substantially H-shaped cross-section. A first materials supporting groove 138 is formed in an area between the outer 132 and inner walls 134, above the center wall 136, and a second materials supporting groove 140 is formed in an area between the outer and inner walls, below the center wall 136. The dovetail projections 124 extend from the inner wall 134, and have a thickness that is approximately equal to a thickness of the display page panel 112.

To mount a materials sample 190 on a page 110 (as shown in FIG. 1), dividers 122 are affixed to the page 110 by inserting the projections 124 into the apertures 118. A materials sample 190 is placed between two adjacent dividers 122 within the materials receiving space 130, as shown in FIG. 1. A lower edge 192 of the sample 190 is placed in the first supporting groove 138, and an upper edge 194 of the sample 190 is placed in the second supporting groove 140. The dividers 122 can be placed in different rows 120 of apertures 118 to provide different material receiving spaces 130, so that the pages 110 can accommodate different sizes of material samples 190. Additionally, the number of material receiving spaces 130 on a page 110 can be adjusted to vary the number of material samples 190 that can be displayed on a particular page 110. For example, in FIGS. 19 and 32, three material receiving spaces are created, while in FIG. 20, four material receiving spaces are created, and in FIG. 31, a single material receiving space is created, on each of the front and rear faces of the page 110.

Figure 26:
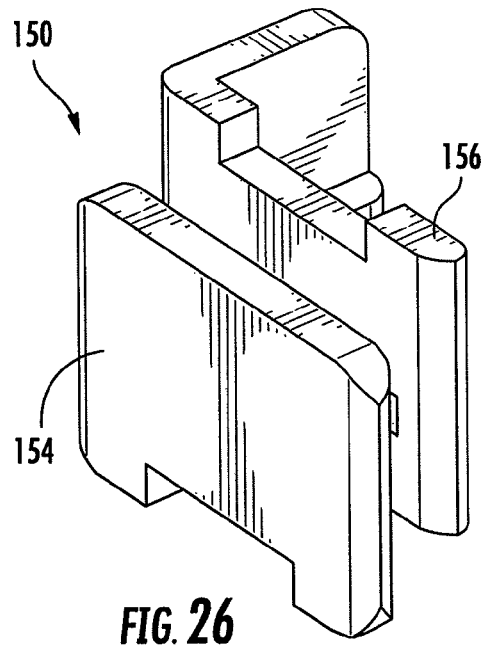
FIG. 26 is a front perspective view of a stop for a display page, as shown in FIG. 20.
Figure 27:
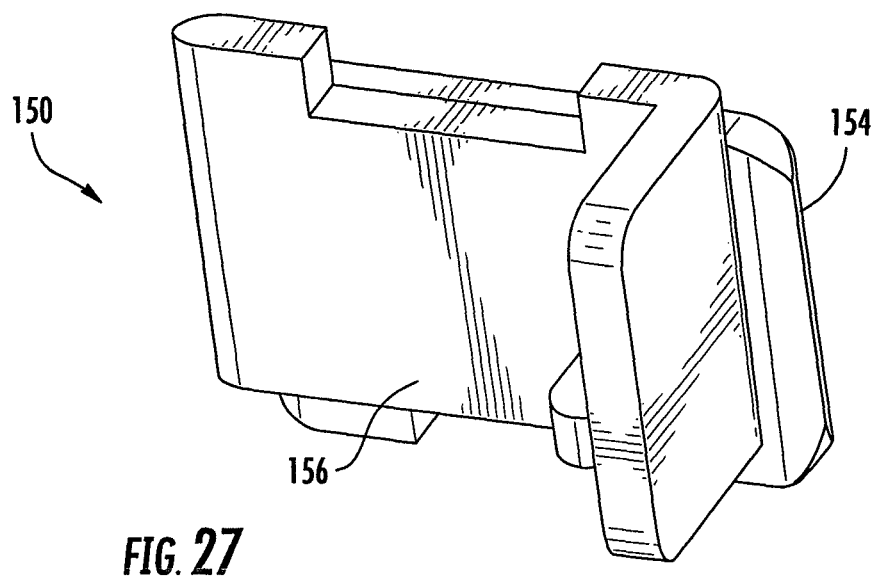
FIG. 27 is rear a perspective view of the stop of FIG. 26.
Figure 28:
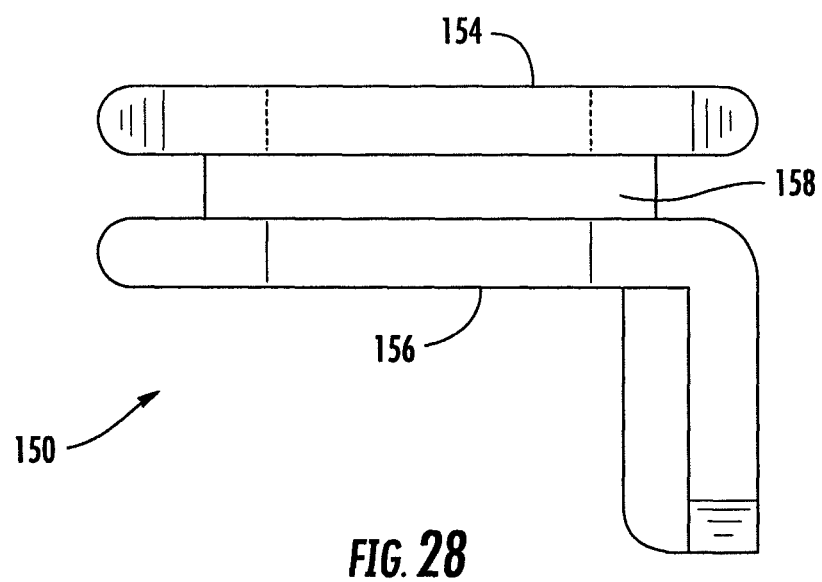
FIG. 28 is a top view of the stop of FIG. 26.

As shown in FIG. 20, the pages 110 preferably also preferably comprise a plurality of stops 150 for reducing a width of the materials receiving spaces 130. A second plurality of apertures 152 are provided in vertical alignment along a side edge of the panels 112. The stops 150, shown in detail in FIGS. 26-28, preferably each comprise a first outer portion 154, a second outer portion 156, and a connecting portion 158. In the preferred embodiment shown, the connecting portion 158 is a strip of material connecting the outer portions 154, 156.

The first outer portion 154 is preferably dimensioned to fit within the apertures 152 of the second plurality. In the preferred embodiment shown, each outer portion 154, 156 is dimensioned to independently fit within one of the apertures 152, each having a generally rectangular shape similar to that of the apertures 152. Slits 160 extend from respective sides of each of the apertures 152. In the preferred embodiment shown, the slits 160 extend in a direction towards the nearest side edge of the panel 112. The slits 160 are each dimensioned to receive a connecting portion 158 of a respective stop 150. The stops 150 are affixed to the panels 112 by first inserting the first or second outer portion 154, 156 through an aperture 152 of the second plurality. The stop 150 is then moved in the direction of the slit 160 and the connecting portion 158 fed through the slit 160 until it abuts a terminal edge thereof.

In the illustrated preferred embodiment, one of the outer portions 154 projects from the front face of the panel 112, while the other outer portion 156 projects from the rear face 116. The stop 150 is slid in place by the connecting portion 158 engaging in the slit 160. Alternatively, the stops 150 could include only a single outer portion projecting from only one of the faces of the panel, with the connecting portion instead being formed as a dovetail projection that engages in a correspondingly shaped dovetail slit.

Figure 29A:
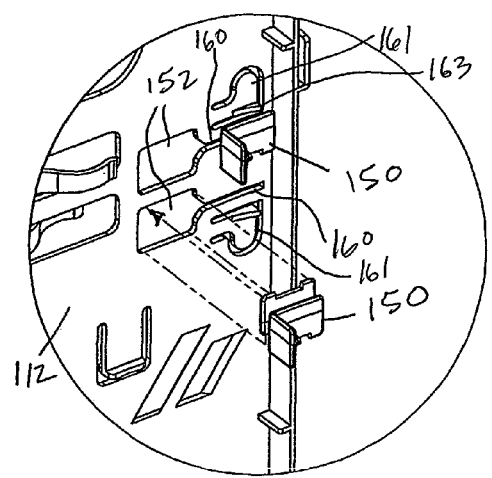
FIGS. 29A and 29B are enlarged partial perspective views showing installation of the stops of FIGS. 26-28 in a first position for a first size of item to be displayed.
Figure 29B:
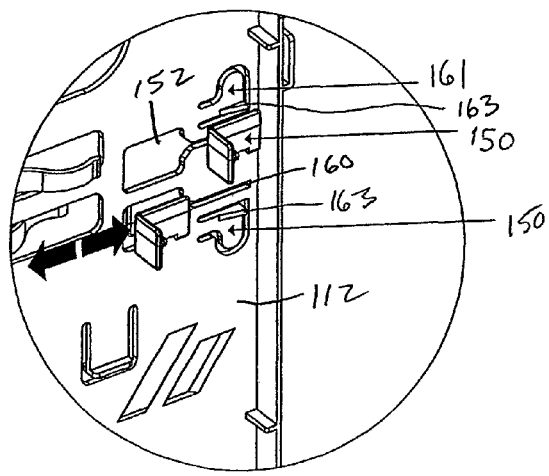
Figure 30A:
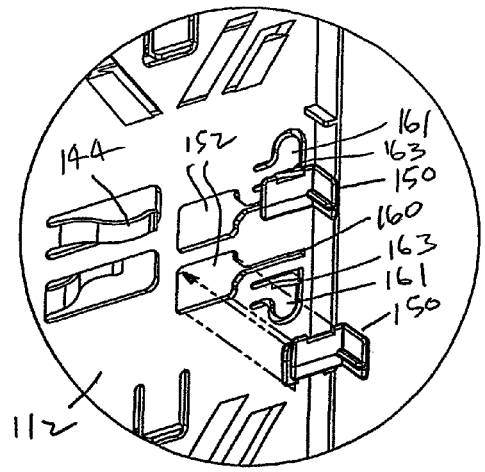
FIGS. 30A and 30B are enlarged partial perspective views showing installation of the stops of FIGS. 26-28 in a second position for a second size of item to be displayed.
Figure 30B:
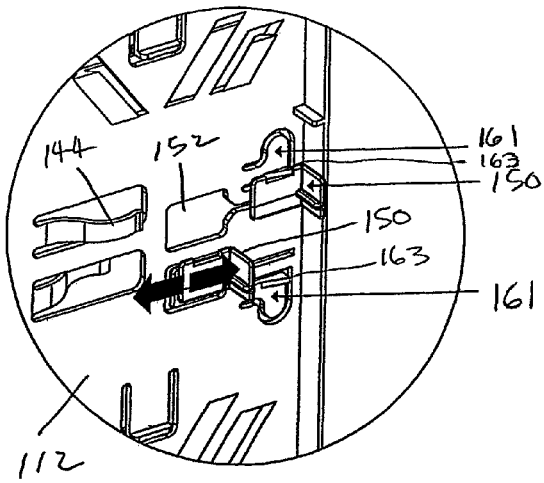
Figure 31:
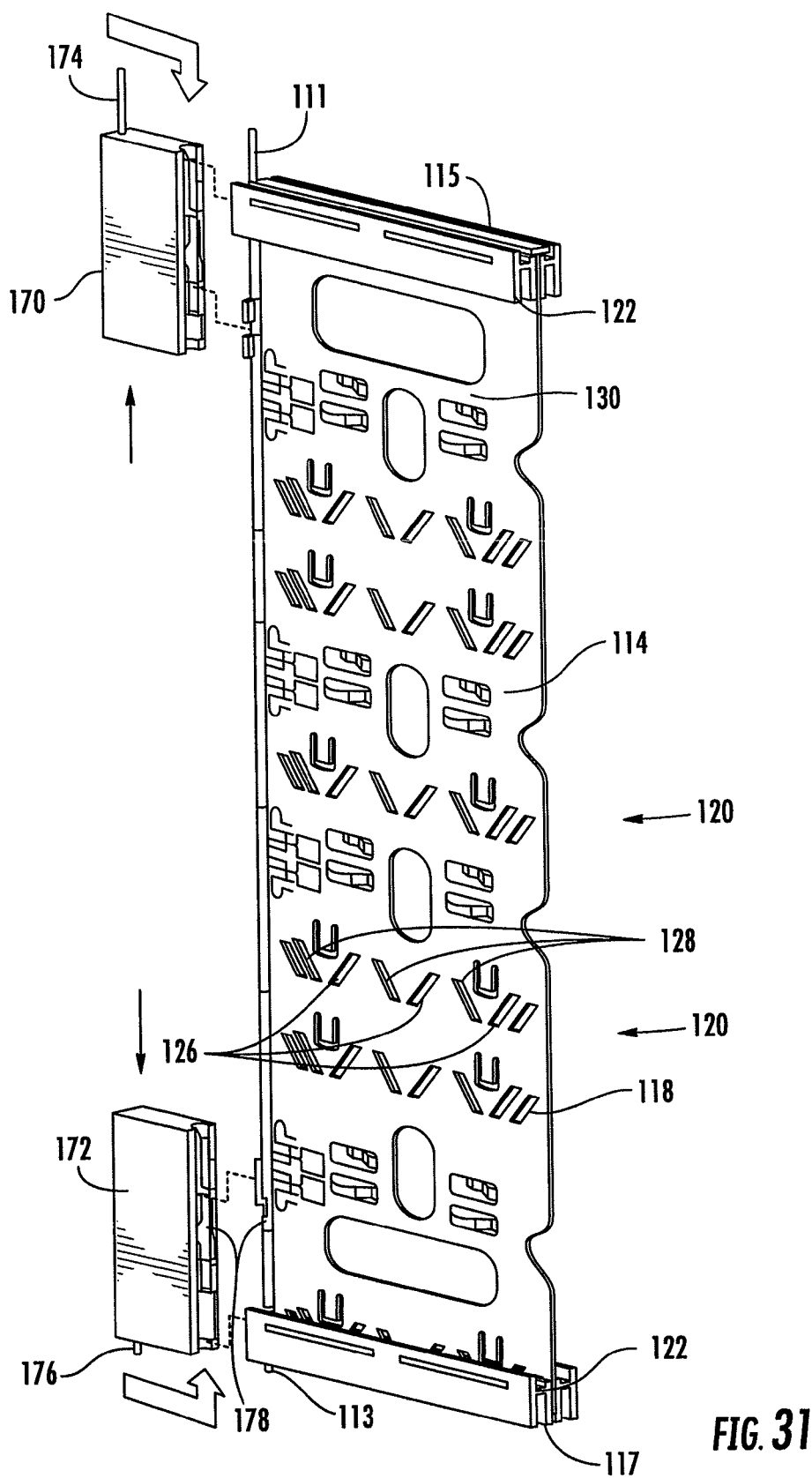
FIG. 31 is a partially exploded front perspective view of the display page, including page extension members.

The outer portions 154, 156 projecting from the faces 114, 116 of the panel shorten the width of the materials receiving spaces 130, such that materials samples 190 of a smaller width can be mounted to the display pages 110. As shown in FIGS. 29A-29B, the stops 150 can be installed in a first orientation to make a shorter product space, while FIGS. 30A-30B show the stops 150 being mounted in a second orientation to make a longer product space available. Additionally, resilient locking tabs 161 are preferably provided, which include a ramp-shaped locking projection 163 that extend from each side that engage in a corresponding notch in the first outer portion 154 or second outer portion 156 in order to retain the stops 150 in position Page extension members 170, 172 may also be provided to increase the extension of the pages 110 from the frame 12. As shown in FIG. 31, upper 170 and lower 172 page extension members 170, 172 are preferably provided for the page 110. The page extension members 170, 172 are configured to be affixed to a single side edge of a panel 112. The upper page extension member 170 is affixed near the top of the panel 112, while the lower page extension member 172 is affixed near the bottom.

In the preferred embodiment shown in FIG. 25, the page extension members 170, 172 each include a gap 178, dimensioned to receive a portion of the edge of the panel 112. The gaps 178 are each dimensioned to form a snapping engagement with the sides of the panel 112, and may include areas of increased or decreased dimensions in order to accommodate other page attachments such as the dividers 122. Alternatively, other means of attaching the page extension members 170, 172 may be employed, such as mechanical fasteners.

A first pin 174 extends upward from the upper page extension member 170, and a second pin 176 extends downward from the lower page extension member 172. The pins 174, 176 are dimensioned similarly to the pins 111, 113 affixed directly to the panel, such that they can be received by the holes 60 of the rails 50. To increase the extension of the page 110 from the frame 12, the pins 174, 176 of the extension members 172 are inserted in the holes 60 of the rails, instead of the pins 111, 113 that are directly attached to the pages 110.

Figure 32:
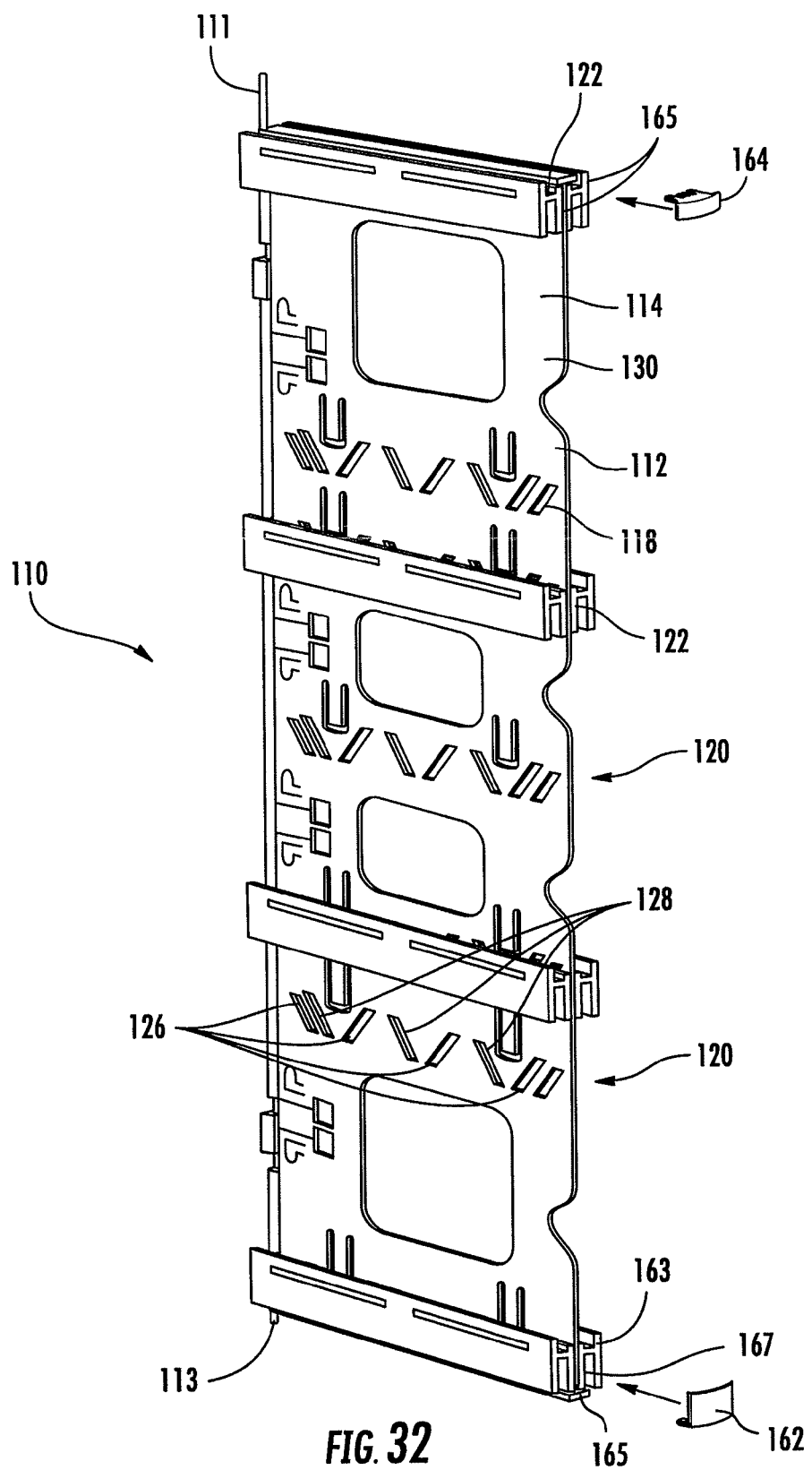
FIG. 32 is a partially exploded front perspective view of the display page of FIG. 17, showing the installation of end caps.
Figure 33:
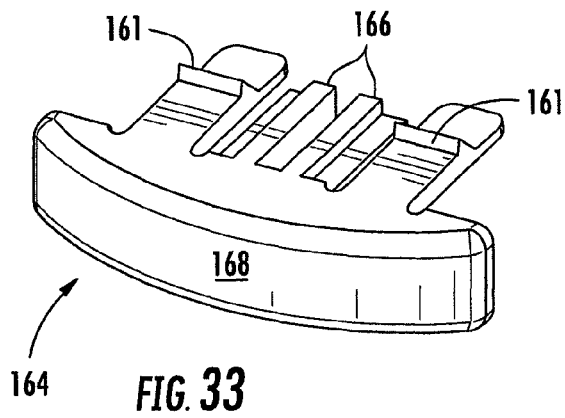
FIG. 33 is a front perspective view of a first end cap, as shown in FIG. 32.
Figure 35:
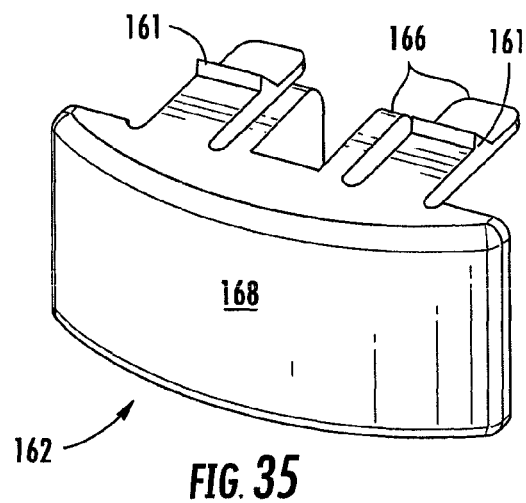
FIG. 35 is a front perspective view of a second end cap, as shown in FIG. 32.
Figure 34:
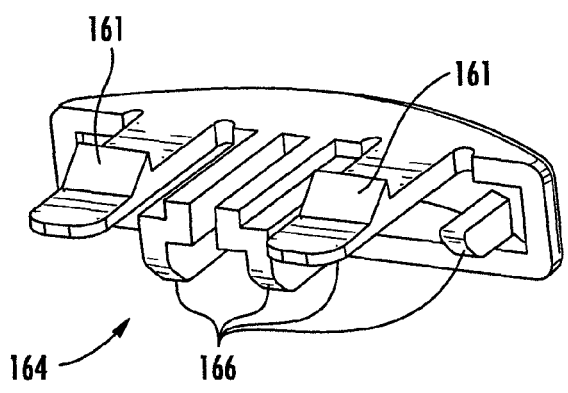
FIG. 34 is a rear perspective view of the end cap of FIG. 33.
Figure 36:
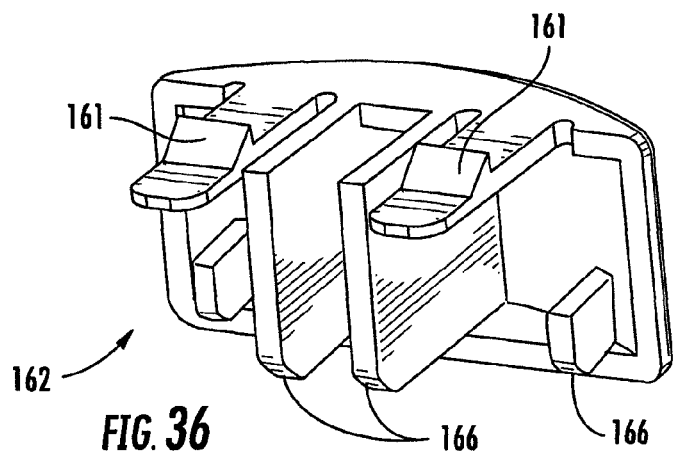
FIG. 36 is a rear perspective view of the end cap of FIG. 35.

Referring to FIG. 32, the pages 110 may also be provided with end caps 162, 164. The end caps 162, 164 are used to cover free ends 163 of the dividers 122. The end caps 162, 164 are shown in detail in FIGS. 33-36. Each of the end caps 162, 164 is provided with a plurality of extensions 166 for engagement with a free end 163 of a divider 122. When dividers 122 are affixed to the panel 112 by the uppermost and lowermost rows 120 of apertures 118, upper and lower passages 165, 167 are created between the upper 115 or lower strips 117, shown in FIG. 17, inner 134, outer 132, and center walls 136 of the dividers 122.

In the preferred embodiment shown, larger end caps 162 and smaller end caps 164 are provided to engage with different sized passages. Specifically, the dividers 122 are oriented such the center wall 136 is closer to the top of the divider than the bottom. As a result, the upper passage 165 is shorter than the lower passage 167. The larger end cap 162 is dimensioned to cover the lower passage 167 while the smaller end cap 164 is dimensioned to cover the upper passage 165.

The extensions 166 of both the larger 162 and smaller 164 end caps are dimensioned to engage in a friction fit within respective passages 165, 167 to hold the end caps 162, 164 in place over the free ends 163 of the dividers 122. Preferably, the extensions 166 fit within passages created on both the front 114 and rear 116 faces of each page 110. Additionally, some of the extensions 166 may be provided with jutting elements 161 for snapping engagement with notches 119 (FIG. 19) defined in the upper strip 115 and lower strip 117 to further secure the end caps 162, 164 in place. Each end cap 162, 164 preferably includes an outer display surface 168 for displaying information about the materials displayed 10 in the display unit, such as the name of a product on display.

While the preferred embodiments of the invention have been described in detail above, the invention is not limited to the specific embodiments described which should be considered as merely exemplary.

What is claimed is:

1. A display unit, comprising:
    a frame including a plurality of spaced apart legs arranged in a common vertical plane, each of the legs having a top end, a bottom end, and a plurality of vertically spaced slots, and a wall having two opposite edge portions attached to two adjacent ones of the legs and arranged parallel to the common vertical plane;
    a plurality of horizontal rails having first and second ends, and first and second knife brackets affixed to the first and second ends of the horizontal rails, each of the knife brackets comprising a plurality of engagement tabs that engage with the slots and a locking device that is movable between a locked position, in which it retains the horizontal rail engaged with a respective one of the legs, and an unlocked position;
    a plurality of display pages, each of the pages being mounted for pivoting movement between an upper rail and a lower rail of the plurality of horizontal rails;
    each of the knife brackets includes a channel that extends to an outer edge of the knife bracket;
    each of the knife brackets further includes front and rear pairs of clasps, each one of the clasps of a respective pair is located on an opposite side of the channel;
    each of the locking devices comprises a central spring element integrally formed between two support plates, a first one of the support plates is fixed in position in the rear pair of clasps and the second support plate is slidably engaged in the front pair of clasps, and the locking strip extends from an outer end of the second support plate.

2. The display unit of claim 1, wherein each of the knife brackets includes an opening, and each of the locking devices further comprises a protuberance dimensioned to engage with the opening.

3. The display unit of claim 1, wherein each of the knife brackets comprises a first engagement tab located above the channel, and at least one second engagement tab located below the channel.

4. The display unit of claim 3, wherein each of the first and the second engagement tabs comprises a neck projecting from an edge of the knife bracket and a first hook portion extending downward from an end of the neck.

5. The display unit of claim 1, wherein:
    each of the display pages comprises a panel having top, bottom, first and second side edges, a pin extends from each of the top and bottom edges at a location near one of the first or second side edges; and
    each of the horizontal rails comprises top and bottom surfaces defining a plurality of holes, each of the pins is dimensioned to be received by a respective one of the holes to pivotably mount the page between the upper and lower rail.

6. The display unit of claim 1, wherein each of the display pages comprises a panel that includes a first plurality of apertures and a plurality of longitudinal dividers including projections, each of the projections is dimensioned to be received by an aperture of the first plurality of apertures.

7. The display unit of claim 6, wherein each of the panels comprises a front face and a rear face, the longitudinal dividers are affixed to the panel at varying vertical increments and extend horizontally across at least one of the front or rear faces by insertion of the projections into the apertures of the first plurality, and an area between two adjacent longitudinal dividers defines a material receiving space.

8. The display unit of claim 7, wherein each of the longitudinal dividers comprises a body having a generally H-shaped cross-section.

9. The display unit of claim 5, wherein each of the panels comprises a front face and a rear face, at least one of the front face or rear face has a plurality of removable stops affixed thereto at vertically aligned locations near the first side edge, a space between the stops and the second side edge defines a material receiving space.

10. The display unit of claim 9, wherein each of the panels comprises a plurality of apertures and each of the stops comprises a portion dimensioned to be received by an aperture.

11. The display unit of claim 1, wherein each of the display pages comprises a panel having first and second side edges and extension members affixed to at least one of the first or second side edges, and the page is pivotably mounted between the upper and lower rails about the extension members.

12. The display unit of claim 11, wherein:
    the extension members comprise an upper extension member having a first pin extending upward therefrom, and a lower extension member having a second pin extending downward therefrom; and
    each of the horizontal rails comprises top and bottom surfaces defining a plurality of holes, each of the pins is dimensioned to be received by a respective one of the holes to pivotably support the page between the upper and lower rail.

* * * * *